J. B. CORNWALL.
CONE ASPIRATOR.
APPLICATION FILED JAN. 27, 1911.
997,372.
Patented July 11, 1911.
3 SHEETS—SHEET 1.
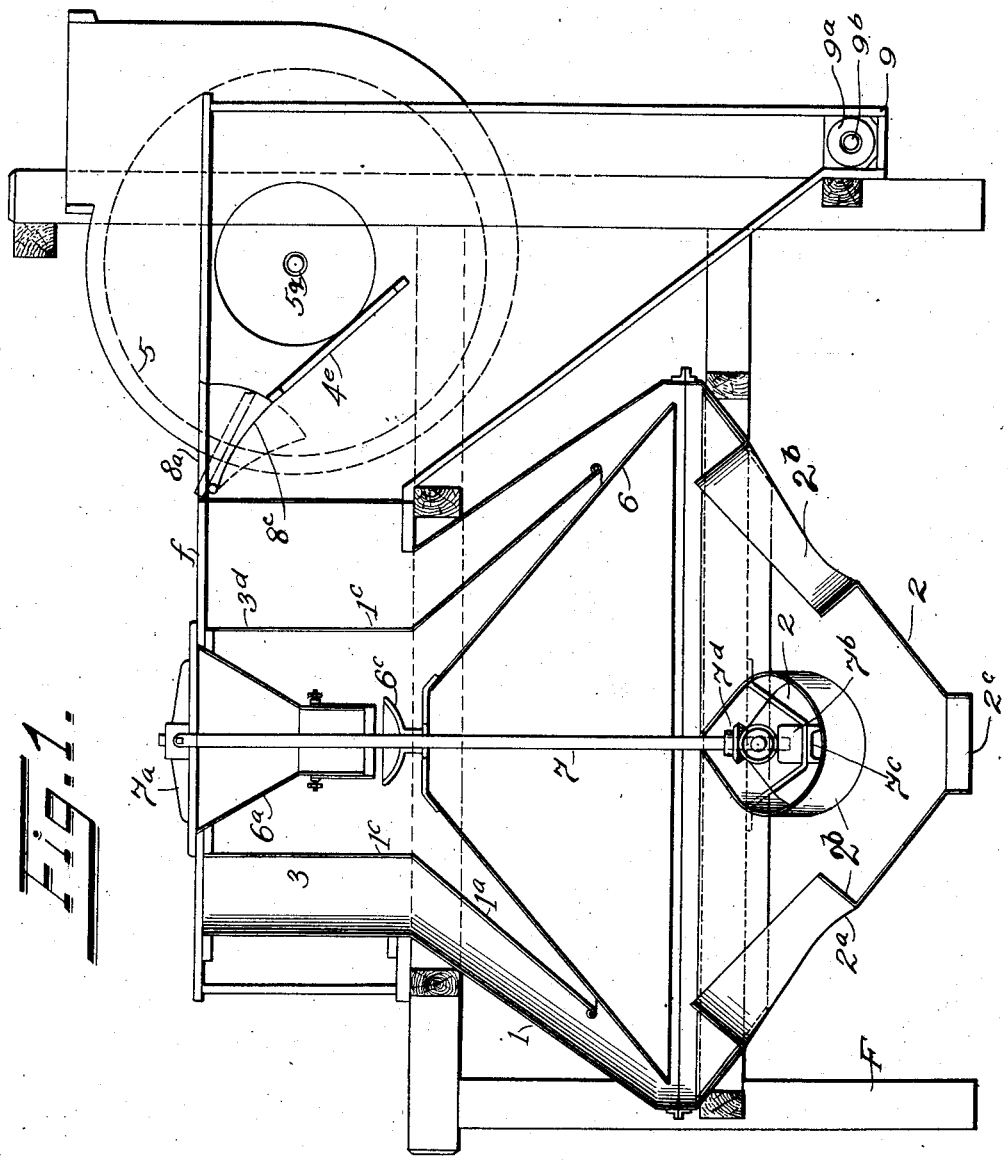
Witnesses:
Inventor
John B. Cornwall
by Alexander Sewell
Att'ys

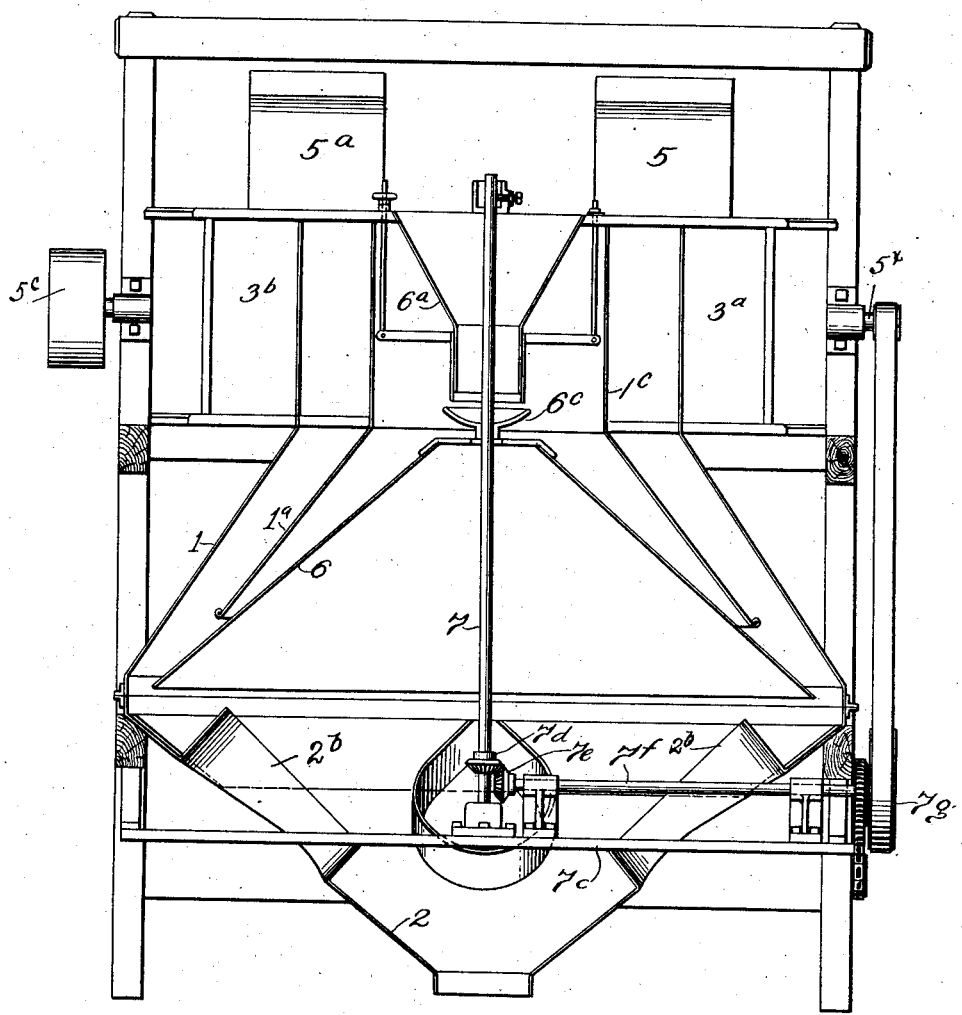

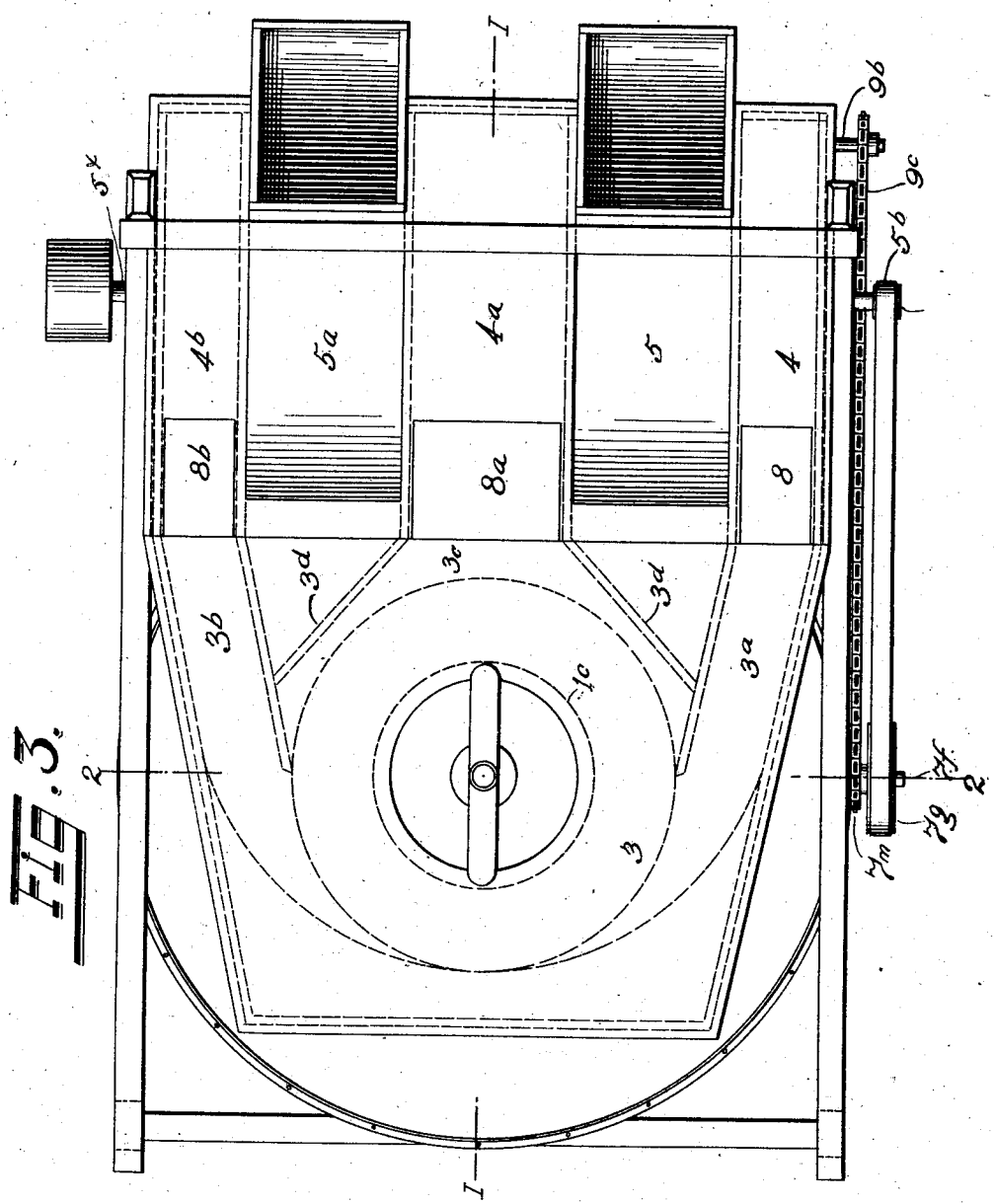

UNITED STATES PATENT OFFICE.

JOHN B. CORNWALL, OF MOLINE, ILLINOIS, ASSIGNOR TO BARNARD AND LEAS MANUFACTURING COMPANY, OF MOLINE, ILLINOIS, A CORPORATION OF ILLINOIS.

CONE-ASPIRATOR.

997,372.  Specification of Letters Patent.  Patented July 11, 1911.

Application filed January 27, 1911.  Serial No. 605,113.

*To all whom it may concern:*

Be it known that I, JOHN B. CORNWALL, of Moline, in the county of Rock Island and State of Illinois, have invented certain new and useful Improvements in Cone-Aspirators; and I hereby declare that the following is a full, clear, and exact description thereof, reference being had to the accompanying drawings, which form part of this specification.

This invention is an improvement in that class of separating machines commonly known as cone aspirators.

The invention provides a machine of this class having a large air capacity and especially adapted for handling grain and its products; and it has particular reference to the construction of the cone separators, which may be used with or without sieve separating devices.

The objects of the invention are to construct the cone separators in such manner as to obtain the maximum effective spread of the grain in the space occupied by the machine, the grain being fed at the apex of the upper cone and the aspirating trunk extending all the way around the base thereof. In this manner I am enabled to obtain about two-thirds more spread of the grain than can be had in the ordinary type of aspirator. The cleaned grain is gathered into an inverted cone which discharges it under the center of the machine at a point where it can be readily spouted in any direction.

In the ordinary round aspirator the air passage above the grain is greatly enlarged so that the force of the air current is so reduced that the heavier particles that have been separated from the grain fall back into the stream and a great portion of them pass out with the grain. In my invention I overcome this defect by using an inside cone so proportioned and arranged within the upper cone as to form an air passage of substantially uniform area, and insure that everything that is lifted by the air will be carried to the fan or settling chambers.

Another novel feature of my machine is that the air is caused to pass forcibly and directly through the grain and into the aspirating trunk,—which is accomplished by admitting the air into the interior of the machine through large openings in the lower or gathering cone, which openings are so arranged that no grain can escape through them. The air thus approaches the stream of grain from within and under the edge of the upper or spreading cone and obviates the necessity of passing the air twice through the grain, and not only lessens the fan power required, but renders the separation more effective.

I prefer to use two fans and produce a very strong suction. The fan chambers are connected to divided channels leading to every part of the aspirating trunk, thus giving a uniform strength of suction all around the separating cone.

The air controlling valves are so made as to admit air from the outside in exact proportion as they cut off the air from the inside of the machine. This has proven to be the best means of regulating the air current, as the fans are constantly supplied with a uniform amount of air and give the best results in the dust collectors as well as keeping the dust spouts always swept clean and preventing deposits therein that would impair the usefulness of the machine.

The working parts of the aspirator are preferably made of heavy galvanized steel, thus making it practically indestructible.

I will now describe the invention in detail with reference to the accompanying drawings which illustrate a practical form of the machine embodying the invention.

In said drawings—Figure 1 is a longitudinal vertical section through the machine on line 1—1, Fig. 3. Fig. 2 is a transverse vertical section on line 2—2, Fig. 3. Fig. 3 is a plan view.

The separating chamber is formed within a casing composed of an upper separating cone 1 and a lower, inverted gathering cone 2; these cones are united at their bases and suitably supported upon and in the main frame F of the machine. The upper cone 1 has a large opening in its top which communicates with a chamber 3 in the upper part of the machine, which chamber communicates at opposite sides of the machine with passages $3^a$, $3^b$ leading to settling chambers 4, $4^b$ at the sides of the machine. The chamber 3 also communicates with a central passage $3^c$ leading into a settling chamber $4^a$ intermediate the chambers 4, $4^b$.

A pair of fan chambers 5, $5^a$ are arranged at opposite sides of the settling chamber $4^a$ and between it and the adjacent settling chambers 4, $4^b$ respectively. Deflectors $3^d$ are arranged in the chamber 3 so as to direct air to the central suction chambers 4ª. The parts are so proportioned that substantially an equal amount of suction is exerted at all points in the chamber 3 so that the air blast around the separating cone 1 and in the passages 3ª, 3ᵇ, 3ᶜ will be practically uniform at all points.

Arranged within cone 1 is a second shorter cone 1ª which extends about two-thirds the depth of the cone 1 and has a more acute pitch than the cone 1. The space between cones 1, 1ª, forms the air outlet passage and keeps it of practically uniform area.

The cylinder 1ᶜ is connected to the top $f$ of the machine and forms the inner wall of the air chamber 3; and within this cylinder 1ᶜ the feed hopper 6ª is located, as hereinafter described.

Located axially within the cones 1, 1ª is a distributing cone 6,—which is suitably supported and centered within the cones 1, 1ª. The lower edge of cone 6 depends somewhat below the cone 1ª, only a narrow annular air passage being left between the lower edge of the cone 6 and the bases of the cones 1 and 1ª.

Arranged axially of the cones 1, 1ª and 6, is a shaft 7 which has bearings in a bracket 7ª attached to the top of the frame F (or cover of chamber 3) and in a step 7ᵇ mounted upon a bar 7ᶜ suspended from frame F, such bar 7ᶜ projecting through diametrically opposite openings 2ª in the lower cone 2. The shaft 7 is provided with a beveled pinion 7ᵈ meshing with a beveled gear 7ᵉ on a shaft 7ᶠ, journaled in bearings on the bar 7ᶜ, and having a pulley 7ᵍ on its outer end, belted to a pulley 5ᵇ on the fan shaft 5ˣ. On shaft 7 is a distributer 6ᶜ located within cylinder 1ª above the cone 6, this distributer being below the discharge end of the feed hopper 6ª, to which the grain can be supplied in any suitable manner as usual.

An important feature of the invention is providing the lower or gathering cone 2 with air inlet openings 2ª, which openings are surrounded by inwardly projecting flanges 2ᵇ which prevent any grain escaping therethrough, and direct it to the outlet 2ᶜ at the bottom of the cone 2.

In cone aspirators as ordinarily made the air is admitted at the top of the lower inverted cone just where the grain comes off of the spreading cone. I found that this had a tendency to cause a stream of air to impinge on the falling grain from the outside but instead of passing through the stream of grain it passed over it. In the present invention instead of admitting air at the base of the upper cone, I make large air openings in the lower or gathering cone, below where the separation takes place. This causes air to first pass inside of the stream of grain and in order to ascend it must pass directly through the grain, and thus will carry up and off everything that is light enough to be lifted by the air, producing a much more thorough separation.

The openings 2ª in the lower or gathering cone 2 are large, but the grain is prevented from passing out through these openings by the flanges 2ᵇ of sufficient depth to cause the grain to pass down between the openings and be discharged at the bottom while the air passes inward through these openings and then outward through the stream of grain dropping off the cone 6. The aforesaid novel manner of passing air through the grain is an important novel feature of the invention.

In order to feed an entirely even stream of grain around the skirt of the cone 6 a spreading disk 6ᵉ can be placed on the shaft 7 above the cone 6. By running the shaft and gears through the openings that are provided for air in the cone 2 I am enabled to drive the spreading disk 6ᵉ and the feed devices and insure an even supply and spread of the grain over cone 6 which is essential to uniform work.

In the upper part of each settling chamber—opposite the air inlet passage (3, 3ª or 3ᵇ) an inclined deflector like 4ᵉ (Fig. 1) may be placed to direct the incoming dust-laden air downwardly into the chamber before it can enter the cylinder of the adjacent fan chamber.

In order to regulate the strength of the air current through the separator valves 8, 8ª, 8ᵇ may be placed in the top of the machine at the entrances to the settling chambers. These valves (see Fig. 1) are each provided on their under side with an arc-shaped metal body, as 8ᶜ, so constructed as to form when closed a continuation of the upper end of the deflector 4ᵉ (see Fig. 2) and assist in directing the air into the settling chamber and excluding the outside air; but when the valve is opened (as indicated in dotted lines Fig. 1) to admit a current of air from the outside the part 8ᶜ contracts the air passage between the separator and the settling chamber an amount equal to the amount of air space which is admitted. The benefits of this semi-automatic regulation of the air supply are obvious, as ordinarily when air is shut off from a fan there is not sufficient air passing to cause the dust collector, dust spouts, etc. to operate properly. But by these valves an equal amount of air can be passed through the fans at all times, but the amount of air passed through the machine can be varied.

The fan shaft 5ˣ may be provided with a pulley 5ᶜ belted to any suitable driver. The grain deposited in the settling chambers 4, 4ª, 4ᵇ can be discharged into a trough 9 and removed by means of a worm conveyer 9ª whose shaft 9ᵇ may be driven by sprocket chain 9ᶜ and gear 9ᵈ from a sprocket 7ᵐ on shaft 7ᶠ.

What I claim is:

1. In a cone separator, the combination of an upper separating cone, a distributing cone therein, and a shorter cone intermediate the distributing and separating cones forming an annular escape passage in the upper part of the separating cone for the escape of the dust-laden air; with an inverted gathering cone connected to the lower end of the upper cone, having openings to admit air below the distributing cone.

2. In combination, a separating cone, a distributing cone within the separating cone, a hopper discharging grain onto the distributing cone, a cylinder surrounding the hopper, a short cone connected with said cylinder and depending between the upper ends of the distributing and separating cones, the space between it and the separating cone forming an annular air passage of substantially uniform area for the outlet of dust-laden air.

3. In a grain separating machine, the combination of a separating cone, a distributing cone therein, an air chamber above the separating cone, a cylinder in said air chamber, a short cone interposed between the upper ends of the separating and distributing cones, and a gathering cone connected to the lower end of the separator cone below the distributing cone and provided with openings admitting air beneath the distributing cone; with settling chambers, air passages connecting the air chamber with the settling chambers, fans connected with the settling chambers, and valves interposed between the air passages and the settling chambers adapted to admit air to the fans.

4. In a separator, the combination of an upper separating cone, and a distributing cone within the separating cone, and a shorter cone intermediate said cones, the space between the shorter cone and the separating cone forming a passage for the escape of the dust-laden air in the upper part of the separating cone of approximately uniform area; with a lower gathering cone having a series of flanged openings for admitting air within the stream of grain and below the distributing cone whereby the air is caused to pass outwardly through the stream of grain into the upper separating cone.

5. In combination, a separating cone, a distributing cone therein; an inverted cone connected with the lower end of the separating cone and provided with a central outlet opening, and a series of inlet openings above the outlet opening each surrounded by inwardly projecting flanges and adapted to direct air into the under side of the distributing cone, and whereby the air is caused to pass outwardly under the edge of the distributing cone and through the stream of grain discharged therefrom.

In testimony that I claim the foregoing as my own, I affix my signature in presence of two witnesses.

JOHN B. CORNWALL.

Witnesses:
JULIUS A. GERWEN,
E. P. CHURCHILL.

---

Copies of this patent may be obtained for five cents each, by addressing the "Commissioner of Patents, Washington, D. C."